US009055495B2

(12) United States Patent
Nukala et al.

(10) Patent No.: US 9,055,495 B2
(45) Date of Patent: Jun. 9, 2015

(54) CELL RE-SELECTION IN A DEVICE CONFIGURED TO OPERATE ACCORDING TO MULTIPLE CELLULAR COMMUNICATION PROTOCOLS

(71) Applicant: Apple Inc., Cupertino, CA (US)

(72) Inventors: Gaurav Nukala, Santa Clara, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/660,571

(22) Filed: Oct. 25, 2012

(65) Prior Publication Data

US 2013/0344872 A1 Dec. 26, 2013

Related U.S. Application Data

(60) Provisional application No. 61/664,244, filed on Jun. 26, 2012.

(51) Int. Cl.
*H04W 36/00* (2009.01)
*H04W 36/14* (2009.01)
(Continued)

(52) U.S. Cl.
CPC .............. *H04W 36/14* (2013.01); *H04W 48/18* (2013.01); *H04W 88/06* (2013.01); *H04W 52/0238* (2013.01); *H04W 52/0245* (2013.01)

(58) Field of Classification Search
CPC ....... H04W 88/10; H04W 8/02; H04W 8/183; H04W 8/22; H04W 8/24; H04W 92/04; H04W 92/18; H04W 92/20; H04W 99/00; H04W 36/0072; H04W 36/0083; H04W 36/30; H04W 36/0061; H04W 36/08; H04W 36/0055; H04W 36/32; H04W 24/02; H04W 36/04; H04W 36/0005; H04W 36/0016; H04W 36/0022; H04W 48/20; H04W 36/14; H04W 36/0094; H04W 36/18; H04W 92/02; H04W 16/30; H04W 36/0088; H04W 52/40; H04W 72/02; H04W 36/00
USPC ......... 455/435, 436, 437, 438, 439, 444, 445, 455/446, 449, 516, 552.1, 435.1, 432.1; 370/331, 333, 338, 328, 335, 337; 707/748; 704/10, 1
See application file for complete search history.

(56) References Cited

U.S. PATENT DOCUMENTS 8,320,915 B2 11/2012 Ryu et al.
2006/0046661 A1 3/2006 Ekvetchavit et al.
(Continued)

FOREIGN PATENT DOCUMENTS

EP 2381720 7/2011
WO 2012/008957 1/2012

OTHER PUBLICATIONS

International Search Report and Written Opinion from PCT/US2013/043391, mailed Sep. 27, 2013, Apple Inc., pp. 1-10.
(Continued)

*Primary Examiner* — Fred Casca
(74) *Attorney, Agent, or Firm* — Meyertons, Hood, Kivlin, Kowert & Goetzel, P.C.

(57) ABSTRACT

Cell re-selection in a device configured to operate according to multiple cellular communication protocols. The device may operate according to a first cellular communication protocol at a first time, which may include attaching to a first cell. The device may operate according to a second cellular communication protocol at a second time. Operations according to the first cellular communication protocol may be suspended while operating according to the second cellular communication protocol. The device may attempt to resume operating according to the first cellular communication protocol at a third time. This may include measuring one or more of signal strength or signal quality of the first cell. The wireless device may select a cell to which to attach at the third time based at least in part on the measured signal strength and signal quality of the first cell.

15 Claims, 4 Drawing Sheets

(51) Int. Cl.
  *H04W 52/02*   (2009.01)
  *H04W 48/18*   (2009.01)
  *H04W 88/06*   (2009.01)

(56) References Cited

U.S. PATENT DOCUMENTS

| | | | |
|---|---|---|---|
| 2008/0188228 A1* | 8/2008 | Pecen et al. | 455/449 |
| 2009/0280815 A1* | 11/2009 | Roberts | 455/436 |
| 2010/0111043 A1 | 5/2010 | Balasubramanian et al. | |
| 2010/0113010 A1* | 5/2010 | Tenny et al. | 455/423 |
| 2010/0130206 A1 | 5/2010 | Chin et al. | |
| 2010/0202429 A1* | 8/2010 | Chin et al. | 370/342 |
| 2010/0216474 A1 | 8/2010 | Park et al. | |
| 2010/0222055 A1* | 9/2010 | Cho et al. | 455/434 |
| 2011/0021201 A1* | 1/2011 | Lee et al. | 455/444 |
| 2011/0076958 A1* | 3/2011 | Fukushi | 455/67.11 |
| 2011/0110256 A1* | 5/2011 | Han et al. | 370/252 |
| 2011/0312274 A1* | 12/2011 | Hildebrand et al. | 455/62 |
| 2012/0163345 A1 | 6/2012 | Camarillo et al. | |
| 2012/0257512 A1* | 10/2012 | Lim | 370/242 |
| 2012/0258707 A1 | 10/2012 | Mathias et al. | |
| 2013/0189988 A1* | 7/2013 | Alonso-Rubio et al. | 455/436 |
| 2013/0215869 A1* | 8/2013 | Srinivasan et al. | 370/331 |

OTHER PUBLICATIONS

Office Action from Taiwanese Application No. 102122024, issued Nov. 18, 2014, English and Chinese versions, pp. 1-31.
International Preliminary Report on Patentability from PCT/US2013/043391, issued Jan. 8, 2015, Apple Inc., pp. 1-8.

* cited by examiner

CELL RE-SELECTION IN A DEVICE CONFIGURED TO OPERATE ACCORDING TO MULTIPLE CELLULAR COMMUNICATION PROTOCOLS

PRIORITY CLAIM

The present application claims benefit of priority to U.S. Provisional Application No. 61/664,244 titled "Cell Re-Selection in a Device Configured to Operate According to Multiple Cellular Communication Protocols" and filed on Jun. 26, 2012, whose inventors are Li Su, and Gaurav Nukala, and which is hereby incorporated by reference in its entirety as thought fully and completely set forth herein.

FIELD

The present application relates to the field of wireless communication, and more particularly to a system and method for re-selecting a cell in a device configured to operate according to multiple cellular communication protocols.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS, LTE, CDMA2000 (e.g., 1xRTT, 1xEV-DO), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. In some cases, this may be accomplished by providing separate functional blocks for each wireless communication technology or standard in a device. However, this may incur additional costs associated with the device due to more (and in some cases duplicate) components being required, and may introduce inefficiencies in device operation (e.g., greater power requirements due to multiple radios, interference between radios adversely affecting each other). This may also adversely affect the form factor of the device, especially if the device is a mobile device for which a smaller (e.g., slimmer, lighter) form factor may be desirable. Accordingly, improvements in wireless communications and devices performing wireless communications would be desirable.

SUMMARY

In contrast to a device which uses separate functional blocks (e.g., separate radios) to implement different wireless communication technologies, an alternative might include a device which uses a single functional block (e.g., a single radio) to implement multiple wireless communication technologies. Such a device could potentially have a lower manufacturing cost (e.g., due to fewer required components and/or simpler overall architecture) and more efficient operation (e.g., due to lower power requirements for the single radio). Additionally, such a single radio design may readily allow for a more desirable form factor (e.g., slimmer, lighter) of the device itself. However, in order to provide a single radio which effectively implements multiple wireless technologies, sophisticated control algorithms may be necessary.

As one example, in some cases a device may implement separate protocol stacks for each of multiple radio-access technologies (RATs) that share a radio. The protocol stacks may take turns operating the radio; for example, at first a first protocol stack may operate using the radio in conjunction with a first cell, but may periodically "tune-away" to allow a second protocol stack to use the radio. While the second protocol stack is operating, the first protocol stack may suspend or temporarily halt operations. Operations may resume once the radio has been "tuned back" to the first protocol stack.

In the time since the radio tuned away from the first protocol stack, the first cell may have gotten weaker, while one or more other cells may have gotten stronger. Thus, simply attempting to re-join the first cell may be ineffective and may result in delays in re-establishing service according to the first RAT. However, if radio control passes back and forth frequently, performing a full scan to determine a cell to join every time a RAT resumes control may represent an excessively costly (e.g., battery- and performance-wise) endeavor. A solution which quickly and efficiently re-establishes service, either with the original cell or with a new cell, would be desirable.

Accordingly, various embodiments are presented of a system and method for re-selecting a cell in a user equipment (UE) device configured to communicate using multiple wireless communication protocols. Embodiments of the system and method presented herein may effectively mitigate the problems and accomplish the objectives described hereinabove, among other beneficial aspects of the system and method which will be apparent to those of skill in the art in light of this disclosure.

Embodiments of the disclosure may be directed to such a method for re-selecting a cell in a UE device configured to communicate using multiple wireless communication protocols, to a UE device configured to implement such a method, and/or to a computer accessible memory medium storing program instructions executable by a processor to implement such a method.

The UE device may include a radio, e.g., including one or more antennas and other analog and/or digital components configured for performing wireless communication. The radio may be configured for use according to either of a first cellular communication protocol (e.g., a first RAT) or a second cellular communication protocol (e.g., a second RAT). In other words, the radio may be shared between the first cellular communication protocol and the second cellular communication protocol, in some embodiments. The first and second RAT may be any of various RATs, including LTE, UMTS, CDMA 2000 (e.g., 1xRTT, 1xEVDO, etc.), etc.

The UE device may also include logic configured to control the radio, such as one or more processors configured to execute program instructions. In addition, the UE device may include a non-transitory computer accessible memory medium, which may store program instructions executable by the UE device. The method may be performed as follows.

The UE device may operate according to the first cellular communication protocol at a first time. Operating according to the first cellular communication protocol at the first time may include attaching to or at least communicating with a first cell. The first cell may operate according to the first cellular communication protocol.

The UE device may include a first protocol stack configured to control the shared radio while the UE device operates according to the first cellular communication protocol. Operating according to the first cellular communication protocol may accordingly include performing any number of procedures at various layers of the first protocol stack, some or all of which may include communicating with a first network via the first cell.

At a second time, the UE device may operate according to a second cellular communication protocol. Operating according to a second cellular communication protocol at the second time may include attaching to or at least communicating with a second cell. The second cell may operate according to the second cellular communication protocol.

The UE device may include a second protocol stack configured to control the shared radio while the UE device operates according to the second cellular communication protocol. Operating according to the second cellular communication protocol may accordingly include performing any number of procedures at various layers of the second protocol stack, some or all of which may include communicating with a second network via the second cell. In some embodiments, the first and second networks may be the same network, or may be communicatively coupled to one another.

Operations according to the first cellular communication protocol may be suspended during operations according to the second cellular communication protocol. Thus, one or more procedures which were in the process of being performed at the first time may have been suspended in order for the UE device to operate according to the second cellular communication protocol at the second time. Operations according to the second cellular communication protocol may similarly be suspended during operations according to the first cellular communication protocol.

At a third time, the UE device may attempt to resume operating according to the first cellular communication protocol. This may include measuring a signal strength metric and/or a signal quality metric of the first cell. The measured signal strength and/or signal quality may be compared to one or more thresholds, e.g., in order to determine whether or not the first cell would likely provide adequate service and/or to determine whether or not there may be a high probability that there is a nearby cell with significantly better signal strength than the first cell.

For example, a first comparison may include comparing the signal strength of the first cell with a first signal strength threshold and the signal quality of the first cell with a first signal quality threshold. If the signal strength is greater than the first signal strength threshold and the signal quality is less than the first signal quality threshold, this may be an indication that there may be a nearby cell with greater signal strength available, which might provide better service to the UE device. In this case, the UE device may perform a first cell re-selection procedure. The first cell re-selection procedure may include searching for nearby cells that operate according to the first cellular communication protocol, performing signal strength and/or signal quality measurements on any such available cells, and selecting a cell to which to attach based at least in part on the signal strength and/or signal quality measurements. The selected cell may be the first cell (e.g., if it is determined that the first cell is most likely to provide adequate service) or another cell (e.g., if it is determined that another cell is most likely to provide adequate service).

If the above-described condition is not met as a result of the first comparison, a second comparison may be performed. The second comparison may include comparing the signal strength of the first cell with a second signal strength threshold and the signal quality of the first cell with a second signal quality threshold. If the signal strength is less than the second signal strength threshold and the signal quality is less than the second signal quality threshold, this may be an indication that the first cell is unlikely to provide adequate service. In this case, the UE device may perform a second cell re-selection procedure. The second cell re-selection procedure may include searching both for nearby cells that operate according to the first cellular communication protocol and for cells that operate according to other compatible cellular communication protocols, performing signal strength and/or signal quality measurements on any such available cells, and selecting a cell to which to attach based at least in part on the signal strength and/or signal quality measurements. The selected cell may be the first cell (e.g., if it is determined that the first cell is most likely to provide adequate service) or another cell (e.g., if it is determined that another cell is most likely to provide adequate service).

If neither of the above-described conditions are met as a result of the first and second comparisons, the UE device may select the first cell to which to attach without performing the first or second cell re-selection procedure. For example, if neither of the above conditions are met, this may (e.g., depending on how the first and second signal strength and signal quality thresholds are configured) be an indication that the first cell may likely provide adequate service and that it is unlikely that another nearby cell may provide significantly better service than the first cell.

Alternatively, the UE device may perform only the first or only the second comparison, and if the associated condition for performing a cell re-selection procedure is not met, the UE device may select the first cell to which to attach without performing the associated (e.g., first or second) cell re-selection procedure.

After selecting a cell to which to reattach (e.g., based on one or more of the signal strength/signal quality measurements, threshold comparisons, and/or cell re-selection procedures), the UE device may attach to the selected cell.

Note that under some circumstances (e.g., if no cell operating according to the first cellular communication protocol would provide adequate service) the selected cell may operate according to another cellular communication protocol. For example, the selected cell may operate according to a cellular communication protocol which is compatible with operation of the wireless device according to the first cellular communication protocol via an inter-radio-access-technology (IRAT) procedure. For example, the UE operating according to the first cellular communication protocol may attach to the selected cell operating according a different but compatible cellular communication protocol via an "IRAT tunnel".

Note also that the second cellular communication protocol may be related to the compatible IRAT cellular protocol; for example, the second cellular communication protocol may be 1xRTT, while the compatible IRAT cellular protocol may be eHRPD; thus, they may be related as members of the CDMA2000 family of cellular communication protocols. Alternatively, they may be unrelated cellular communication protocols.

After selecting a cell to which to attach, the UE device may attach to (camp on) the selected cell and resume operating according to the first cellular communication protocol. This may include resuming any protocol stack procedures which were interrupted at the second time and/or initiating new procedures according to the first cellular communication protocol using the shared radio.

BRIEF DESCRIPTION OF THE DRAWINGS

A better understanding of the present subject matter can be obtained when the following detailed description of the preferred embodiment is considered in conjunction with the following drawings, in which.

While the features described herein susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present Patent Application.
3GPP: Third Generation Partnership Project
3GPP2: Third Generation Partnership Project 2
GSM: Global System for Mobile Communications
UMTS: Universal Mobile Telecommunications System
LTE: Long Term Evolution Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
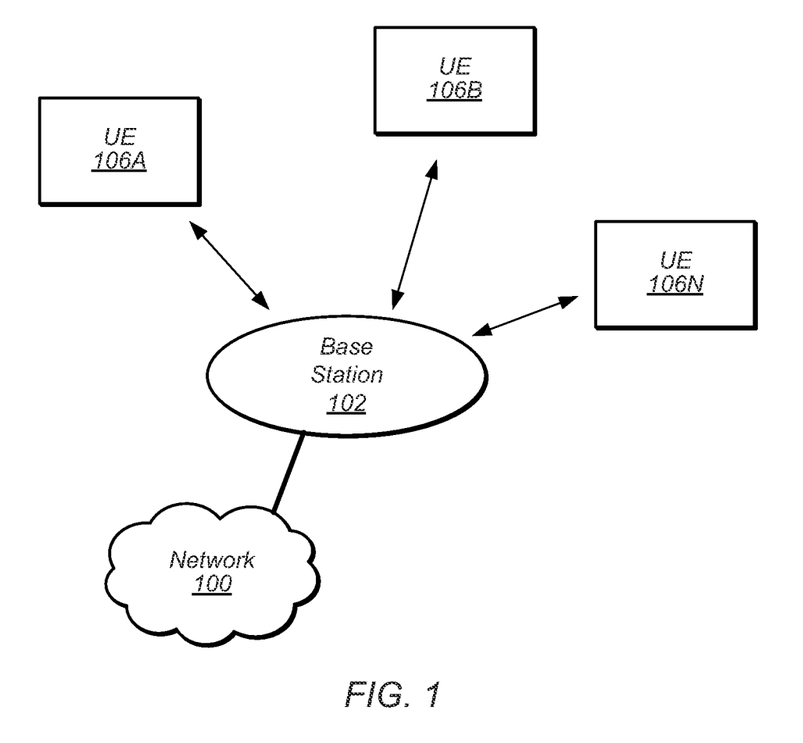
FIG. 1 illustrates an exemplary (and simplified) wireless communication system according to one embodiment.
Figure 2:
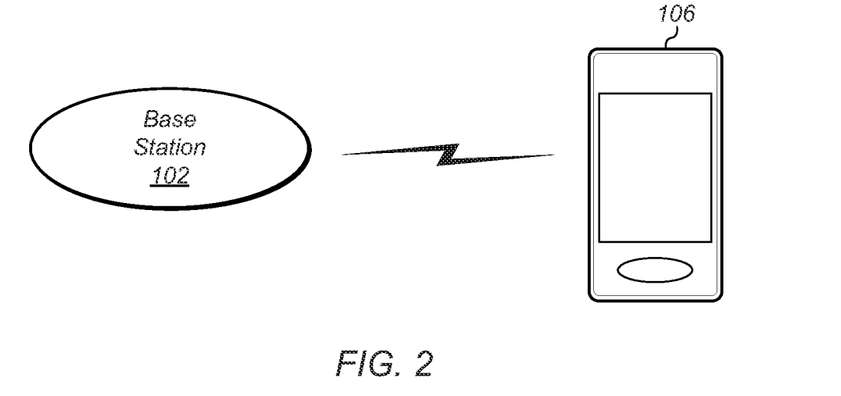
FIG. 2 illustrates a base station in communication with user equipment according to one embodiment.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are referred to as UEs or UE devices.

The base station 102 may be a base transceiver station (BTS) or cell site, and comprises hardware that enables wireless communication with the user devices 106-1 through 106-N. The base station 102 may also be equipped to communicate with a network 100. Thus, the base station 102 may facilitate communication between the user devices and/or between the user devices and the network 100.

The base station 102 and the user devices may be configured to communicate over the transmission medium using any of various wireless communication technologies or telecommunication standards such as GSM, CDMA, WLL, WAN, WiFi, WiMAX etc.

UE 106 may be capable of communicating using multiple wireless communication standards. For example, a UE 106 might be configured to communicate using either of a 3GPP cellular communication standard (such as LTE) or a 3GPP2 cellular communication standard (such as a cellular communication standard in the CDMA2000 family of cellular communication standards). Thus in some embodiments, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. The UE may also or alternatively include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA 2000, LTE, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA 2000 (1xRTT/1xEV-DO) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1 xRTT, and separate radios for communicating using each of Wi-Fi and Bluetooth. Other configurations are also possible.

Figure 3:
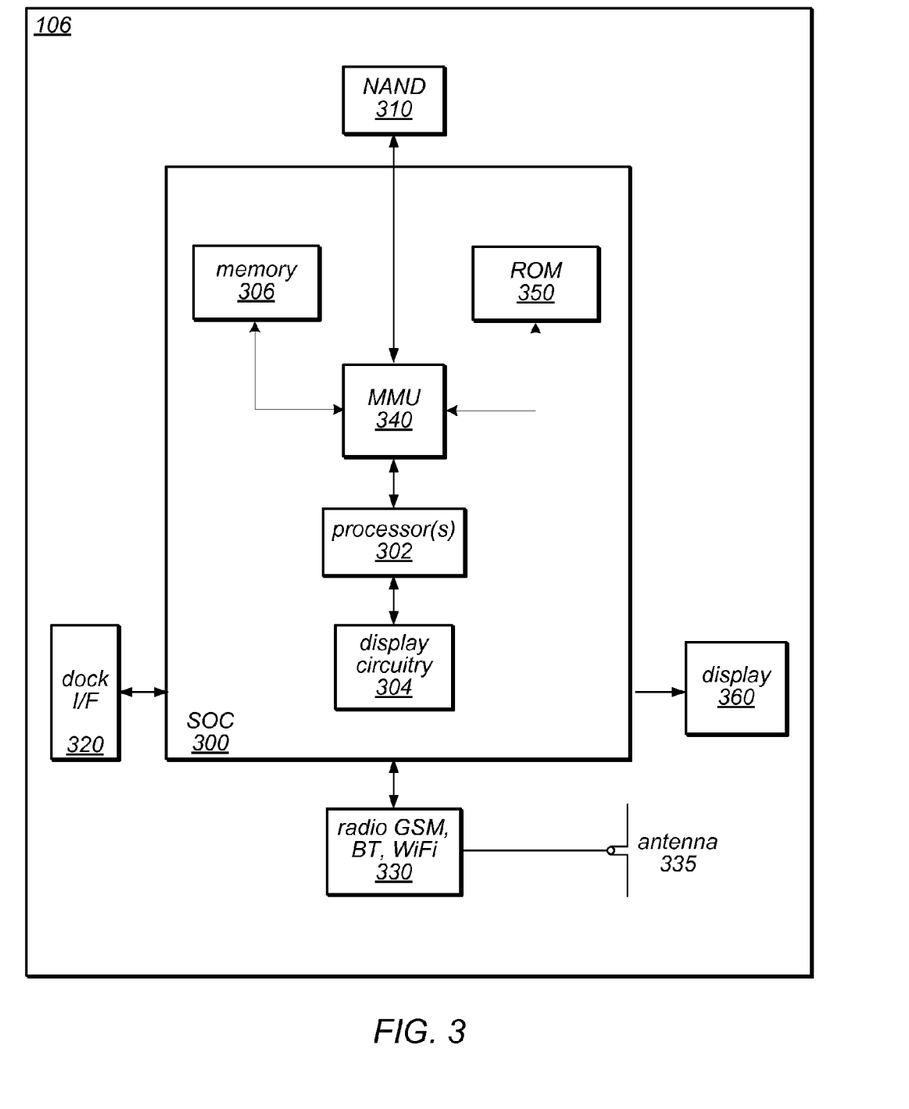
FIG. 3 illustrates an exemplary block diagram of a user equipment device, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, CDMA2000, Bluetooth, WiFi, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

As described herein, the UE 106 may include hardware and software components for implementing a method for re-selecting a cell according to embodiments of this disclosure. FIG. 4 and the description provided with respect thereto relate to one such method.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4A:
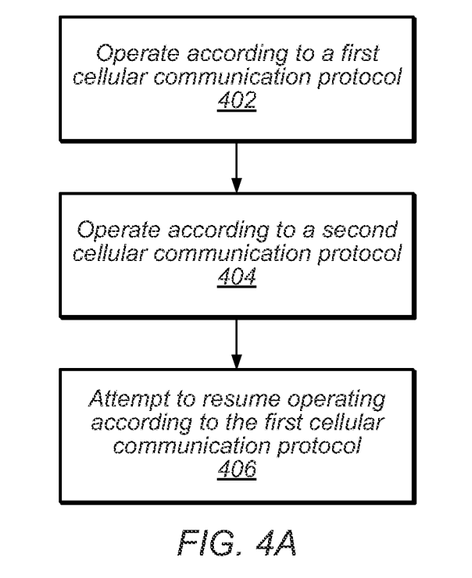
FIGS. 4A-4B are flowchart diagrams illustrating embodiments of a method for cell re-selection in a user equipment device according to one embodiment.
Figure 4B:
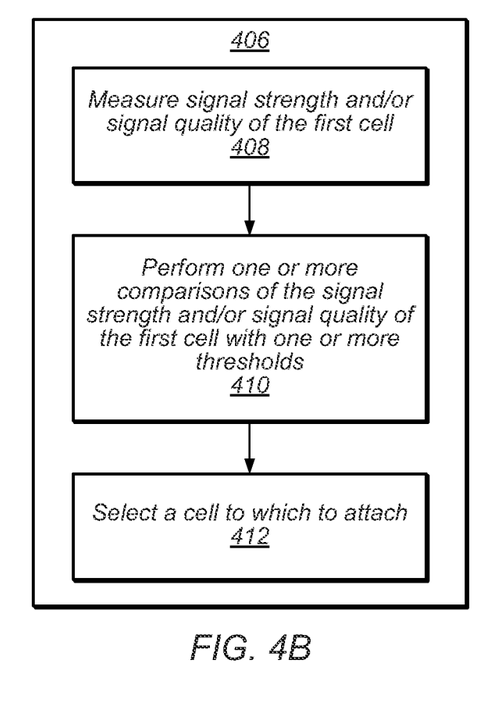

FIGS. 4A-4B—Flowcharts

FIGS. 4A-4B are flowchart diagrams illustrating a method for a device to re-select a cell according to one set of embodiments. The method may be implemented by a wireless UE device (such as UE 106), which may be configured to communicate using multiple cellular communication protocols (e.g., multiple radio access technologies (RATs)).

The UE may be configured to communicate using multiple cellular communication protocols using a shared radio. For example, one or more RF signaling components, such as one or more antennas, gain elements, filtering elements, ADCs and/or DACs, and/or other analog or digital circuitry may be used to perform wireless communication by the UE according to any of the multiple cellular communication protocols using the shared radio. Note that not all RF components may need to be shared by the cellular communication protocols for the radio to be considered shared. It may be the case that at any given time, only one of the cellular communication protocols sharing a radio may operate.

Sharing a radio between two (or more) cellular communication protocols may be advantageous for energy efficiency, manufacturing cost, and form factor of a UE device, among other possible advantages. If the communication protocols provide substantially similar functionality to the wireless device such that there is little or no advantage to operating using both communication protocols simultaneously, there is little or no disadvantage functionally to the sharing of a radio between them. For example, if one of the cellular communication protocols is a fourth generation RAT such as LTE, while the other is a third generation RAT such as CDMA2000, both cellular communication protocols may provide telecommunication, SMS, and data (e.g., Internet access) connectivity, albeit possibly with different throughput, latency, reliability, etc. Thus, it may be desirable to provide a UE with the ability to operate according to either LTE or CDMA2000 (or another combination of cellular communication protocols), e.g., to provide a larger and/or higher quality service area, but it is possible that there may be no significant advantage for both protocols to operate simultaneously.

Consideration of the shared nature of the radio components between cellular communication protocols may be useful and possibly necessary in designing the mechanisms for controlling operation of the UE according to each cellular communication protocol. For example, some such aspects which might merit consideration include determining techniques for passing control back and forth, starting and stopping operation according to each cellular communication protocol at appropriate times, and determining those appropriate times for each cellular communication protocol to operate.

One particular aspect of shared radio usage between cellular communication protocols that merits consideration relates to resuming operations according to one cellular communication protocol after control has been passed from the other cellular communication protocol. Given that time may have passed while the other cellular communication protocol used the radio, it is quite possible that signal strength/quality of the original serving cell may have degraded significantly and/or signal strength/quality of another cell may have improved significantly in the interim (e.g., if the UE is moving away from the original serving cell and towards one or more other cells). So automatically attempting to resume operations on the original serving cell may result in delays in achieving service and/or resuming any procedures which were initiated previously. However, it may also frequently be possible that the original serving cell remains the best option (e.g., if the UE remains substantially stationary). So automatically performing a full scan of nearby cells every time a cellular communication protocol re-gains control of the radio may be wasteful of time and energy, which may negatively affect user experience and battery life.

An alternative could include measuring one or more signal strength and/or signal quality metrics of the original serving cell, as a preliminary test of whether the original serving cell would provide adequate service and/or whether there might be another cell available which would provide better service. Based on such relatively basic measurements, the UE device could determine that the original serving cell will likely continue to provide adequate service, or determine that performing a cell re-selection procedure to attempt to find a new serving cell is justified. Such a method may provide better overall performance than either always attempting to resume operations on the original serving cell or always performing a full cell re-selection procedure.

FIGS. 4A-4B illustrate one such method. The method shown in FIGS. 4A-4B may be used in conjunction with any of the systems or devices shown in the above Figures, among other devices. In various embodiments, some of the method elements shown may be performed concurrently, in a different order than shown, or may be omitted. Note also that additional method elements may also be performed as desired.

In 402, the UE device may operate according to a first cellular communication protocol at a first time. Operating according to the first cellular communication protocol at the first time may include attaching to or at least communicating with a first cell. The first cell may operate according to the first cellular communication protocol.

The UE device may include a first protocol stack configured to control the shared radio while the UE device operates according to the first cellular communication protocol. Operating according to the first cellular communication protocol may accordingly include performing any number of procedures at various layers of the first protocol stack, some or all of which may include communicating with a first network via the first cell.

In 404, the UE device may operate according to a second cellular communication protocol at a second time. Operating according to the second cellular communication protocol at the second time may include attaching to or at least communicating with a second cell. The second cell may operate according to the second cellular communication protocol.

The UE device may include a second protocol stack configured to control the shared radio while the UE device operates according to the second cellular communication protocol. Operating according to the second cellular communication protocol may accordingly include performing any number of procedures at various layers of the second protocol stack, some or all of which may include communicating with a second network via the second cell. In some embodiments, the first and second networks may be the same network, or may be communicatively coupled to one another.

Operations according to the first cellular communication protocol may be suspended during operations according to the second cellular communication protocol. Thus, one or more procedures which were in the process of being performed at the first time may have been suspended in order for the UE device to operate according to the second cellular communication protocol at the second time. Note that operations according to the second cellular communication protocol may similarly be suspended during operations according to the first cellular communication protocol.

The first and second cellular communication protocols may be different generations of cellular communication protocols. For example, the first cellular communication protocol may be a fourth generation (4G) cellular communication protocol while the second cellular communication protocol may be a third generation (3G) cellular communication protocol. Thus, the first cellular communication protocol may generally provide higher throughput, lower latency, etc., than the second cellular communication protocol, given similar signal strength. Accordingly, the UE device may be configured to preferably operate according to the first cellular communication protocol, and only operate according to the second wireless communication protocol to monitor pages or other messages for the UE device which are transmitted according to the second cellular communication protocol or as a backup if inadequate service (e.g., signal strength) is available according to the first cellular communication protocol. Alternatively, the first and second cellular communication protocols may have similar characteristics (e.g., throughput, latency, reliability, availability, etc.). In this case, one cellular communication protocol may be used primarily and the other secondarily, or each may be given equal preference, as desired.

In 406, the UE device may attempt to resume operating according to the first cellular communication protocol. Attempting to resume operating according to the first cellular communication protocol may include several steps, shown in FIG. 4B as steps 408-412.

In 408, signal strength and/or signal quality of the first cell may be measured. The signal strength and signal quality of the first cell may be measured using one or more signal strength and/or signal quality metrics. For example, signal strength metrics such as reference signal received power (RSRP) (e.g., for LTE) or Ec/Io (e.g., for eHRPD) may be used, and/or a signal quality metric such as reference signal received quality (RSRQ) (e.g., for LTE) may be used. Other signal strength and/or signal quality metrics may be used as desired.

In 410, one or more comparisons of the signal strength and/or signal quality of the first cell with one or more thresholds may be performed. The measured signal strength and/or signal quality may be compared to the one or more thresholds in order to determine whether or not the first cell would likely provide adequate service and/or to determine whether or not there may be a high probability that there is a nearby cell with significantly better signal strength than the first cell.

For example, a first comparison may include comparing the signal strength of the first cell with a first signal strength threshold and the signal quality of the first cell with a first signal quality threshold. If the signal strength is greater than the first signal strength threshold and the signal quality is less than the first signal quality threshold, this may be an indication that there may be a nearby cell with greater signal strength available, which might provide better service to the UE device.

If the above-described condition is not met as a result of the first comparison, a second comparison may be performed. The second comparison may include comparing the signal strength of the first cell with a second signal strength threshold and the signal quality of the first cell with a second signal quality threshold. If the signal strength is less than the second signal strength threshold and the signal quality is less than the second signal quality threshold, this may be an indication that the first cell is unlikely to provide adequate service. Note that the first signal strength threshold may be greater than the second signal strength threshold.

In 412, a cell to which to attach may be selected. The cell to which to attach may be selected based on the measured signal strength and/or signal quality of the first cell, the one or more comparisons, and possibly a further cell re-selection procedure, e.g., depending on the result of the one or more comparisons.

For example, if the first comparison indicates that there may be a nearby cell with greater signal strength than the first cell available, the UE device may perform a first cell re-selection procedure. The first cell re-selection procedure may include searching for nearby cells that operate according to the first cellular communication protocol.

Signal strength and/or signal quality may be measured for any such available cells, and a cell to which to attach may be selected. The selected cell may be selected based at least in part on the signal strength and/or signal quality measurements. For example, in some embodiments, the highest signal strength of a neighboring cell may be compared to the signal strength of the original cell. If it is sufficiently greater (e.g., greater than a signal strength difference threshold), the neighboring cell may be selected; if it is not sufficiently greater, the original serving cell may be selected. Alternatively, the neighboring cell may be selected if the signal strength of the neighboring cell is greater than the signal strength of the original cell by any margin, if desired. Thus, the selected cell may be the first cell (e.g., if it is determined that the first cell is most likely to provide adequate service after all) or another cell (e.g., if it is determined that another cell is most likely to provide adequate service).

If the second comparison indicates that the first cell is unlikely to provide adequate service, the UE device may perform a second cell re-selection procedure. The second cell re-selection procedure may include searching both for nearby cells that operate according to the first cellular communication protocol and for cells that operate one or more other cellular communication protocols. For example, the UE device may be configured to operate according to the first communication protocol with inter-radio-access-technology (IRAT) connection to a cell which operates according to a compatible IRAT cellular communication protocol. One example of this might be if the first cellular communication protocol is LTE, and the UE device is configured to search for eHRPD systems via an IRAT connection while operating according to LTE.

Signal strength and/or signal quality may be measured for any such available cells, and a cell to which to attach may be selected. The selected cell may be selected based at least in part on the signal strength and/or signal quality measurements. For example, the highest signal strength of a neighboring cell that operates according to the first cellular communication standard may be compared to the signal strength of the original cell. If it is sufficiently greater (e.g., greater than a signal strength difference threshold), the neighboring cell may be selected. If it is not sufficiently greater, the highest signal strength of a neighboring cell that operates according to another compatible cellular communication standard may be compared to a third signal strength threshold (e.g., a signal strength threshold specific to the cellular communication standard in question). If the signal strength of that neighboring cell is greater than the third signal strength threshold, that neighboring cell may be selected. If it is not, the original serving cell may be selected.

Thus, the selected cell may be the first cell (e.g., if it is determined that the first cell is most likely to provide adequate service) or another cell (e.g., if it is determined that another cell is most likely to provide adequate service).

It should be noted that the IRAT compatible cellular communication standard may in some cases be related to the second cellular communication standard; for example, the IRAT compatible cellular communication standard might be eHRPD while the second cellular communication standard might be 1xRTT, which are related as members of the CDMA2000 family of cellular communication standards. Thus it is possible that the neighboring cell that operates according to the compatible cellular communication standard may be the second cell (e.g., the second cell may provide 1xRTT and eHRPD service). In such a case, the UE device may have recently measured signal strength and/or signal quality of the second cell (e.g., if the third time is immediately after the second time), which may advantageously be used in turn as part of the second cell re-selection procedure, e.g., as described above. It should also be noted that although the above-described first and second cell re-selection procedures are two possible such cell re-selection procedures, any number of other cell re-selection procedures may be used alternatively or in addition to those described.

If neither of the above-described conditions are met as a result of the first and second comparisons, the UE device may select the first cell to which to attach without performing the first or second cell re-selection procedure. For example, if neither of the above conditions are met, this may (e.g., depending on how the first and second signal strength and signal quality thresholds are configured) be an indication that the first cell may likely provide adequate service and that it is unlikely that another nearby cell may provide significantly better service than the first cell.

As another possibility, the UE device may perform only the first or only the second comparison, and if the associated condition for performing a cell re-selection procedure is not met, the UE device may select the first cell to which to attach without performing the associated (e.g., first or second) cell re-selection procedure.

After selecting a cell to which to attach/reattach (e.g., based on one or more of the signal strength/signal quality measurements, threshold comparisons, and/or cell re-selection procedures described above and/or other such procedures), the UE device may attach to (e.g., camp on) the selected cell. The UE device may then resume operating according to the first cellular communication protocol. This may include resuming any protocol stack procedures which were interrupted at the second time and/or initiating new procedures according to the first cellular communication protocol using the shared radio.

Note that under some circumstances (e.g., if no cell operating according to the first cellular communication protocol would provide adequate service) the selected cell may operate according to a cellular communication protocol which is not the first cellular communication protocol (e.g., a third cellular communication protocol). In this case, the UE device may still operate according to the first cellular communication protocol, but may utilize an IRAT connection in order to attach to/communicate with the selected cell. The device may thereby be capable of providing similar functionality (e.g., telecommunications, SMS, data services, etc.) as when operating purely according to the first cellular communication protocol.

Figure 5:
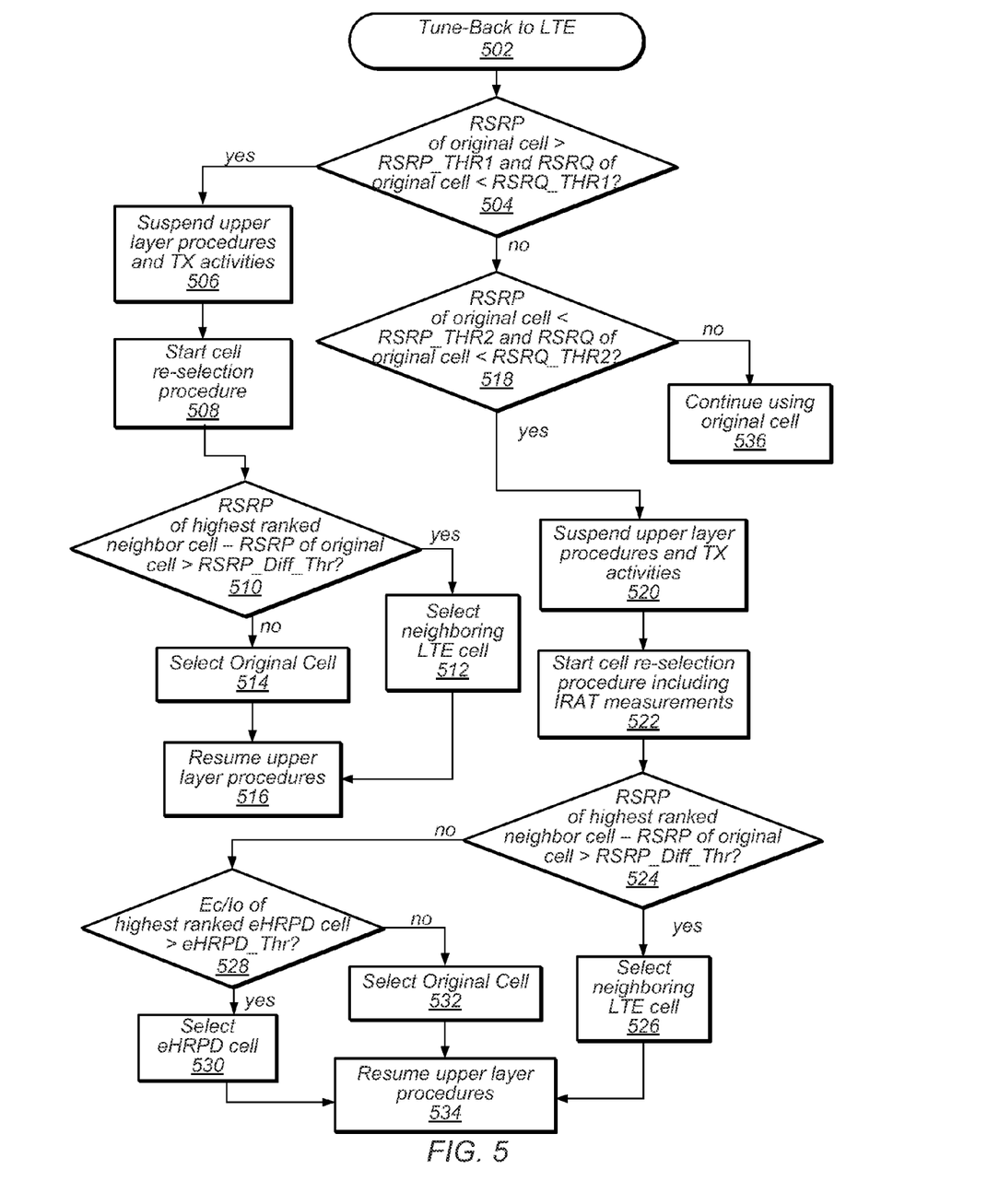
FIG. 5 is a flowchart diagram illustrating an exemplary use-case implementation of part of the method of FIGS. 4A-4B.

FIG. 5—Exemplary Use Case

FIG. 5 is a flowchart diagram illustrating an exemplary use-case implementation of the method of FIGS. 4A-4B. Details of this exemplary use case provided hereinbelow are provided by way of example only and are not intended to be limiting to the disclosure as a whole. It will be recognized by those skilled in the art that numerous variations of and alternatives to the details of the exemplary use case are possible and should be considered within the scope of this disclosure.

The UE device may implement LTE as the first cellular communication protocol and 1xRTT as the second cellular communication protocol. In this case, it may generally be considered preferable to operate primarily according to LTE, and to operate according to 1xRTT only periodically, e.g., to check for paging messages, or if no LTE service is available.

Thus, the UE device may operate according to LTE most of the time, but may periodically "tune-away" the radio to 1xRTT to monitor 1xRTT pages. For example, the UE device might tune-away to monitor 1xRTT pages every 5.12 s, every 2.56 s, every 1.28 s, or some other multiple of 1.28 s, e.g., in accordance with the paging cycle of the 1xRTT system.

While the radio of the UE device is tuned-away to monitor (and possibly decode and act on) 1xRTT paging messages, the LTE protocol stack may be suspended. Accordingly, ongoing LTE procedures such as radio resource control (RRC), layer 1 (L1), etc., procedures may be suspended or stopped during the suspension of the LTE protocol stack, and may be resumed or restarted at the time of resumption (e.g., after the UE device has finished decoding any paging messages, etc).

While the UE device was tuned-away from the original LTE serving cell, that original cell may have gotten weaker, while one or more other (LTE or compatible inter-RAT) cells may have gotten stronger. This may be relatively common in some scenarios, such as if a user of the UE device were travelling on a highway or in a train in an area of overlapping coverage by the original cell and a new cell.

If the UE device were to automatically resume using the same serving cell as it was attached to before the tune-away in such a scenario, and attempt to trigger upper layer procedures (such as might have been suspended during the tune-away), this could result in a significant accessibility delay, which might be perceived by the user. For example, if the device were to trigger a random access channel (RACH) procedure in response to a non-access stratum (NAS) service request, the UE device might be able to transmit a RACH message but not be able successfully decode the response (e.g., a MSG2) because of high interference from the new cell. In one set of embodiments, depending on the maximum number of RACH's allowed or the T300 timer, the UE might RACH as many as 64 times. As noted above, this may result in a service delay which is noticeable to the user.

In order to avoid this scenario, the flowchart of FIG. 5 illustrates one possible process by which the UE device may intelligently determine whether to continue using the original cell or to select a new cell to which to attach. The method may begin upon tuning back to the LTE protocol stack in 502.

The UE device may measure reference signal received power (RSRP) and reference signal received quality (RSRQ) (e.g., as metrics indicative of signal strength and signal quality respectively) of the original serving cell. In 504, a first comparison may be made.

The first comparison may include comparing the RSRP of the original serving cell with a first RSRP threshold and the RSRQ of the original serving cell with a first RSRQ threshold. If the RSRP of the original serving cell is greater than a first RSRP threshold and the RSRQ of the original serving cell is less than a first RSRQ threshold, this may imply that there is a high probability that a strong neighbor cell is available. For example, the combination of relatively high RSRP and relatively low RSRQ may indicate that even though the signal strength of the original serving cell is decent, signal quality is poor, likely due to interference of stronger neighboring cell. Note that the first RSRP threshold and the first RSRQ threshold may be selected as desired according to the overall system configuration. Some examples of possible threshold values might include −100 (or −101, −102, −99, etc) dBm for the first RSRP threshold and −10 (or −11, −12, etc) dBm for the first RSRQ threshold.

In this case, the method may proceed to step 506, in which the UE device may suspend (or continue suspending) upper layer procedures and any transmit activities (e.g., physical random access channel (PRACH), physical uplink shared channel (PUSCH), physical uplink control channel (PUCCH)), and thence to step 508, in which the UE device may start a cell re-selection procedure. The cell re-selection procedure may be a 'panic re-selection'. It may include searching for nearby LTE cells, and ideally identifying and selecting the stronger neighboring cell which was causing the interference, and attaching to it.

In 510, the cell re-selection procedure may begin by comparing the RSRP of the highest ranked neighboring LTE cell minus the RSRP of the original serving cell with an RSRP difference threshold.

If the difference is greater than the difference threshold, this may indicate that the neighboring LTE cell may provide adequate service. Thus in this case, the process may proceed to step 512, in which the highest ranked neighboring LTE cell may be selected.

If the difference is less than the difference threshold, this may indicate that no other nearby LTE cell is likely to provide adequate service. In this case, the process may proceed to step 514, in which the original serving cell may be selected.

From either 512 or 514, the process may proceed to step 516 in which the UE device may resume the upper layer procedures on the selected cell, which may be a neighboring cell or the original serving cell, depending on the previous step.

Alternatively, if the RSRP of the original serving cell is less than the first RSRP threshold or the RSRQ of the original serving cell is greater than the first RSRQ threshold, the method may proceed to decision 518, in which a second comparison may be performed. The second comparison may include comparing the RSRP of the original serving cell with a second RSRP threshold and the RSRQ of the original serving cell with a second RSRQ threshold.

If the RSRP of the original serving cell is less than the second RSRP threshold and the RSRQ of the original serving cell is less than the second RSRQ threshold, this may imply that the original serving cell will likely not provide adequate service, though there may or may not be a stronger LTE or other neighbor available. Note that the second RSRP threshold and the second RSRQ threshold may be selected as desired according to the overall system configuration. Some examples of possible threshold values might include −110 (or −111, −112, −113, etc) dBm for the second RSRP threshold and −10 (or −11, −12, etc) dBm for the second RSRQ threshold. The first RSRP threshold may typically be greater than the second RSRP threshold. The first RSRQ and the second RSRQ threshold may be equal in some embodiments, but may be different if desired.

In this case, the method may proceed to step 520, in which the UE device may also suspend (or continue suspending) upper layer procedures and any transmit activities (e.g., PRACH, PUSCH, PUCCH), and thence to step 522, in which the UE device may start a cell re-selection procedure. The cell re-selection procedure may also be a 'panic re-selection'. It may include searching for nearby cells, including both LTE cells and compatible inter-RAT cells (e.g., eHRPD cells). RSRP (and/or Ec/Io, e.g., for eHRPD systems) may be measured for any such neighboring cells.

In step 524, the cell re-selection procedure may begin by comparing the RSRP of the highest ranked neighboring LTE cell minus the RSRP of the original serving cell with an RSRP difference threshold.

If the difference is greater than the difference threshold, this may indicate that the neighboring LTE cell may provide adequate service. Thus in this case, the process may proceed to step 526, in which the highest ranked neighboring LTE cell may be selected.

If the difference is less than the difference threshold, this may indicate that no nearby LTE cell is likely to provide adequate service. In this case, the process may proceed to step 528, in which Ec/Io of the highest ranked eHRPD cell may be compared with an Ec/Io threshold.

If the Ec/Io of the highest ranked eHRPD cell is greater than the Ec/Io threshold, this may indicate that the eHRPD cell in question may provide adequate service, and so the method may proceed to step 530, in which the eHRPD cell may be selected.

If the Ec/Io of the highest ranked eHRPD cell is not greater than the Ec/Io threshold, this may indicate that the eHRPD cell in question may not provide adequate service, and so the method may proceed to step 532, in which the original cell may be selected.

From step 526, 530, or 532, the method may proceed to step 534, in which upper layer procedures may be resumed on the selected cell, be it the original cell, a neighboring LTE cell, or a neighboring IRAT cell.

Note that at decision 518, if RSRP of the original serving cell is greater than the second RSRP threshold or the RSRQ of the original serving cell is greater than the second RSRQ threshold, this may be an indication that the original serving cell may provide adequate service. In this case, the method may proceed to step 536, in which the UE device may continue using the original serving cell, e.g., without undertaking a full cell re-selection procedure.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for cell re-selection, wherein the method is implemented by a wireless device implementing a plurality of cellular communication protocols, the method comprising:
operating according to a first cellular communication protocol at a first time, comprising attaching to a first cell that operates according to the first cellular communication protocol;
operating according to a second cellular communication protocol at a second time, wherein operating according to the second cellular communication protocol at the second time is in accordance with a paging cycle of the second cellular communication protocol, wherein operating according to the second cellular communication protocol at the second time comprises attaching to a second cell that operates according to the second cellular communication protocol to monitor paging messages according to the second cellular communication protocol, wherein operations according to the first cellular communication protocol are suspended while operating according to the second cellular communication protocol,
wherein the wireless device implements the first and second cellular communication protocols using a shared radio, wherein the first cellular communication protocol comprises a first protocol stack, wherein the second cellular communication protocol comprises a second protocol stack, wherein only one of the first and second protocol stacks controls the shared radio at a time;
attempting to resume operating according to the first cellular communication protocol at a third time, wherein the third time occurs after finishing monitoring paging messages according to the second cellular communication protocol, comprising:
measuring a signal strength metric of the first cell;
measuring a signal quality metric of the first cell; and
selecting a cell to which to attach based at least in part on the measured signal strength and signal quality metrics of the first cell, wherein selecting a cell to which to attach comprises: determining if signal strength of the first cell is greater than a first signal strength threshold; determining if signal quality of the first cell is less than a first signal quality threshold; and
performing a first cell re-selection procedure in response determining that signal strength of the first cell is greater than the first signal strength threshold and signal quality of the first cell is less than the first signal quality threshold.

2. The method of claim 1, wherein performing the first cell re-selection procedure comprises searching for nearby cells that operate according to the first cellular communication protocol.

3. The method of claim 1, wherein selecting a cell to which to attach comprises:
determining if signal strength of the first cell is less than a second signal strength threshold;
determining if signal quality of the first cell is less than a second signal quality threshold;
performing a second cell re-selection procedure if signal strength of the first cell is less than the second signal strength threshold and signal quality of the first cell is less than the second signal quality threshold.

4. The method of claim 3, wherein performing the cell re-selection procedure comprises searching for nearby cells that operate according to the first cellular communication protocol and searching for nearby cells that operate according to one or more cellular communication protocols other than the first cellular communication protocol.

5. The method of claim 4, further comprising:
measuring at least one of signal strength or signal quality of the second cell;
comparing the at least one of signal strength or signal quality of the second cell to at least one of the signal strength or signal quality of the first cell;
comparing the at least one of signal strength or signal quality of the second cell to one or more signal strength or signal quality thresholds;
selecting the second cell to which to attach based on the comparisons;
attaching to the second cell via an inter-radio-access-technology (IRAT) connection at the third time.

6. The method of claim 1,
wherein the selected cell operates according to the first cellular communication protocol, wherein the method further comprises:
resuming operating according to the first cellular communication protocol in conjunction with the selected cell at the third time, wherein resuming operating according to the first cellular communication protocol comprises resuming operations which were initiated at the first time and suspended at the second time.

7. The method of claim 1,
wherein the first cellular communication protocol is LTE, wherein the second cellular communication protocol is 1xRTT.

8. A wireless user equipment (UE) device configured to communicate using a plurality of radio access technologies (RATs) using a single radio, wherein the UE comprises:
a radio, wherein the radio comprises circuitry configured for wireless communication, wherein the radio is configured for use according to either of a first RAT or a second RAT, wherein a first protocol stack provides communication capability according to the first RAT, wherein a second protocol stack provides communication capability according to the second RAT, wherein only one of the first and second protocol stacks controls the radio at a time;
logic configured to control the radio, wherein the logic is configured to:

initiate operations according to the first RAT, wherein initiating operations according to the first RAT comprises attaching to a first cell which operates according to the first RAT;

initiate operations according to the second RAT in accordance with a paging cycle of the second RAT to monitor paging messages according to the second RAT, wherein operations according to the first RAT are suspended during the operations according to the second RAT;

resume operations according to the first RAT after finishing monitoring paging messages according to the second RAT, wherein to resume operations according to the first RAT, the logic is configured to:

measure a signal strength metric of the first cell;
measure a signal quality metric of the first cell;
select a cell to which to attach based at least in part on the measured signal strength and signal quality metrics of the first cell, wherein selecting a cell to which to attach comprises:
if signal strength of the first cell is greater than a first signal strength threshold and signal quality of the first cell is less than a first signal quality threshold, performing a first cell re-selection procedure;
if signal strength of the first cell is less than a second signal strength threshold and signal quality of the first cell is less than a second signal quality threshold, performing a second cell re-selection procedure.

9. The UE of claim 8, wherein to select a cell to which to attach, the logic is configured to:
compare the measured signal strength and signal quality metrics of the first cell to one or more thresholds; and
determine whether or not to perform a cell re-selection procedure based on said comparing.

10. The UE of claim 8,
wherein the first cell re-selection procedure comprises searching for cells that operate according to the first RAT and selecting a cell to which to attach based at least in part on one or more signal strength metrics or one or more signal quality metrics.

11. The UE of claim 8,
wherein the second cell re-selection procedure comprises searching for nearby cells that operate according to the first RAT and searching for nearby cells that operate according to one or more RATs other than the first RAT.

12. The UE of claim 8,
wherein the logic is configured to determine to perform one of the first or second cell re-selection procedure if comparing the measured signal strength and signal quality metrics of the first cell to the one or more thresholds indicates that there is a high probability that there is a nearby cell having a greater signal strength than the first cell.

13. The UE of claim 8,
wherein the logic is configured to attempt to re-attach to the first cell if comparing the measured signal strength and signal quality metrics of the first cell to the one or more thresholds indicates that the first cell provides one or more of acceptable signal strength or signal quality.

14. A non-transitory computer accessible memory medium comprising program instructions executable by a wireless device for re-selecting a cell, wherein the wireless device comprises a radio configured to operate according to a first cellular communication protocol when controlled by a first protocol stack implementing the first cellular communication protocol or a second cellular communication protocol when controlled by a second protocol stack implementing the second cellular communication protocol, wherein only one of the first and second protocol stacks controls the radio at a time, wherein when executed, the program instructions cause the wireless device to:

operate according to the first cellular communication protocol at a first time, comprising communicating with a first cell that operates according to the first cellular communication protocol;

operate according to the second cellular communication protocol at a second time, wherein operating according to the second cellular communication protocol at the second time is in accordance with a paging cycle of the second cellular communication protocol, wherein operating according to the second cellular communication protocol at the second time comprises communicating with a second cell that operates according to the second cellular communication protocol to monitor paging messages according to the second cellular communication protocol, wherein operations according to the first cellular communication protocol are suspended while operating according to the second cellular communication protocol;

attempt to resume operating according to the first cellular communication protocol at a third time, wherein the third time occurs after finishing monitoring paging messages according to the second cellular communication protocol, wherein to attempt to resume operating according to the first cellular communication protocol at the third time, the program further cause the wireless device to:

measure a signal strength metric of the first cell;
measure a signal quality metric of the first cell;
compare signal strength and signal quality of the first cell with one or more thresholds;
if comparing signal strength and signal quality of the first cell with one or more thresholds produces a first result, perform a first cell re-selection procedure, wherein the first result is a result indicating that there is a high probability that a nearby cell with a stronger signal strength than the first cell is available;
if comparing signal strength and signal quality of the first cell with one or more thresholds produces a second result, select the first cell to which to re-attach without performing the first cell re-selection procedure, wherein the second result is a result indicating that the first cell will likely provide adequate service;
if comparing signal strength and signal quality of the first cell with one or more thresholds produces a third result, perform a second cell re-selection procedure, wherein the third result is a result indicating that the first cell may not provide adequate service; and
select a cell with which to communicate based at least in part on comparing the signal strength and signal quality of the first cell with the one or more thresholds.

15. The memory medium of claim 14,
wherein the first cell re-selection procedure comprises measuring at least one of signal strength and signal quality of nearby cells that operate according to the first cellular communication protocol;
wherein the second cell re-selection procedure comprises measuring at least one of signal strength and signal quality both of nearby cells that operate according to the first cellular communication protocol and of nearby cells that operate according to one or more cellular communication protocols other than the first cellular communication protocol.

* * * * *